Aug. 22, 1950     J. A. GAUDRAULT     2,520,034
BRIDGE CONSTRUCTION FOR PAIR OF EYEGLASSES
Filed Nov. 8, 1948
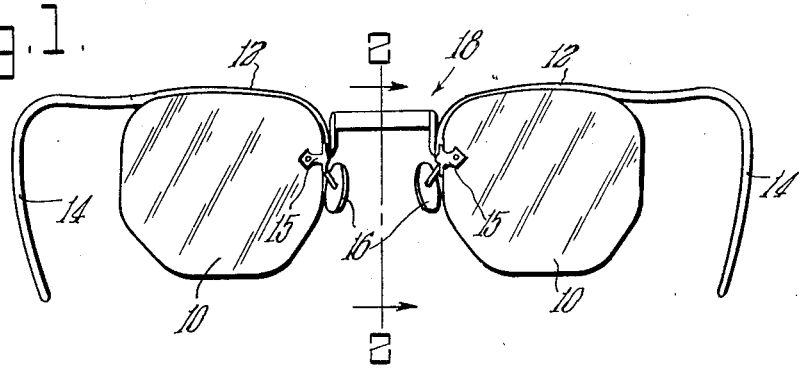
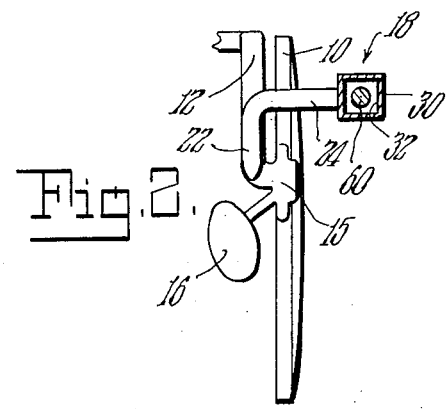
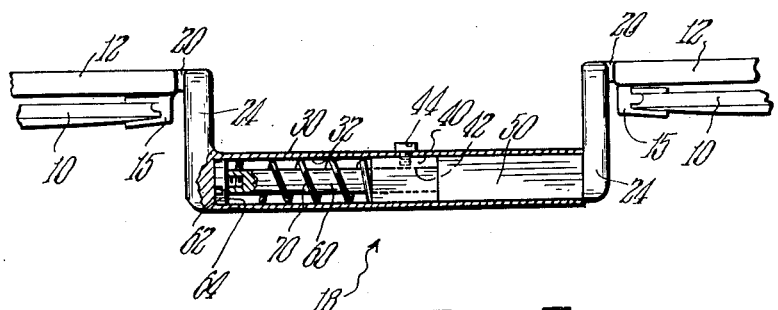
INVENTOR.
Joseph A. Gaudrault
BY Patented Aug. 22, 1950

2,520,034

UNITED STATES PATENT OFFICE 2,520,034

BRIDGE CONSTRUCTION FOR PAIR OF EYEGLASSES

Joseph A. Gaudrault, Holyoke, Mass.

Application November 8, 1948, Serial No. 58,851

1 Claim. (Cl. 88—46)

My invention relates to improvements in eye glasses and is directed more particularly to the provision of an improvement in the bridge construction of eye glasses.

It is the principal object of my invention to provide a novel and improved bridge construction of the type in which the means is inconspicuous and substantially invisible from view but which provides nevertheless all of the strength and rigidity of metallic rim type spectacles of the ordinary character.

It is another object of my invention to provide a construction of the above described character which is relatively simple and compact in accordance with the desires of the purchasing public and which is not only attractive in its appearance and practical in its value but also reliable in its operation.

It is a still further object to provide a device which is constructed of relatively simple parts which are adapted to be readily assembled and which once assembled are positively and securely retained in operative rotation and which cannot be readily separated from each other, either accidentally or otherwise.

The noses of different people are of different widths. Bridge construction heretofore known generally have the common objection that they are not expansible or adjustable. This causes obvious difficulties for certain wearers and accordingly I have devised a novel means whereby such difficulties and objections are overcome. I accomplish this by the provision of a device which permits expansibility of the frame.

Other prime objects of my invention include first, the provision of a simplified construction of a pair of eye glasses, second, the attainment of a higher degree of speed of construction of the device due to its simplification in construction and its unique composition of parts, third, the attainment of a flexibility or a capability of adjustment by which a large variety of people can be accommodated by eye glasses of the same size and shape, fourth, the achievement of greater ease in adjustment and repairs, and fifth, the provision of an improved construction which may be made more economically and with fewer operations in the manufacture of its parts, as well as in the assembly of the same, than prior devices known in the art.

Further objects are to provide in a manner as hereinafter set forth, an ophthalmic mounting which is strong, durable, compact, distinctive in appearance, thoroughly efficient in its use, and readily installed with respect to a pair of lenses.

To these and other ends and with the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein in the above mentioned drawings annexed hereto and forming a part of this specification, I have shown but one embodiment of the invention which is now deemed preferable, but it is to be understood that changes and modifications may be made within the scope of the appended claim without departing from the spirit of the invention.

Briefly, and in its broadest aspect, my invention comprises the following principal parts:

Separate lens supporting frames, arms, a guide member, an abutment, a slide member, a pilot, a retainer and a compression spring.

In the drawing:

Fig. 1 is a front elevational view of a pair of eyeglasses incorporating the apparatus of my invention, Fig. 2 is a sectional elevational view along the line 2—2 in Fig. 1, and Fig. 3 is a partial plan view showing the apparatus of my invention with certain parts broken away for purposes of clarity.

Referring now to the drawings more in detail, in which similar characters of reference indicate corresponding parts in all the figures my invention will now be fully described.

A pair of lenses are shown in Fig. 1 and each is generally indicated by 10. Each lens 10 is mounted in and supported by a metallic lens supporting frame or rim generally designated 12 having its body preferably of less thickness than the metallic frames or rims now in general use. As in the well known manner, each frame will conform substantially in contour to the arcuate contour of its correlated lens and will merge at its outer end into a curved rearwardly directed outer portion constituting what is conventionally referred to as a temple piece 14.

At each of the frames at the inner end thereof is provided a clamp 15 for securing the frame to the lens and a nose pad 16 fixed to the clamp in the well known manner.

The bridge is generally indicated by the numeral 18 and is made up of parts now to be described.

To each of the frames 12 at the inner end thereof is secured a lower end 20 of an arm. Extending upwardly from the lower end 20 of each arm is a lower portion 22 and extending outwardly and forwardly away from the upper extremity of the lower portion 22 of each arm is an upper portion 24.

An elongated guide member 30 is provided with one of its ends fixed to the extremity of one of the upper portions 24. This member 30 extends outwardly therefrom towards the extremity of the other of the upper portions 24.

The guide member may be of any desired configuration although in the form shown in Fig. 2 it is indicated as being square in cross section and is provided with a longitudinal non-round bore 32 throughout its length, which bore is open at its free end opposite from the end at which the guide member is fixed to the upper portion 24.

An abutment 40 is fixed within the bore of the guide member intermediate the ends thereof and this is provided with a pilot bore 42 extending therethrough. The abutment may be fixed to the guide member as by a screw 44 or by other conventional means.

A slide member 50 has one of its extremities secured to and extending from the extremity of the other of the upper portions 24. This member 50 extends outwardly therefrom towards the extremity of the first mentioned upper portion 24.

The member 50 is receivable within the bore of the guide member 30. As with the non-round bore 32, the member 50 is non-round in its cross section and is therefore non-rotatable therein.

A pilot 60 has one end fixed to the free end of the slide member 50 so as to extend through the bore of the abutment 40 and to float within the bore 32 when the members 30 and 50 are in operating relationship.

A retainer member 62 is fixed as a threaded engagement to the free or floating end of the pilot 60 and is of such configuration as to provide a flange 64 against which one extremity of a compression spring 70 may abut when disposed within the bore 32 and around the pilot 60 between the retainer 62 and the abutment 40 all as shown in Fig. 3.

In such an arrangement, the spring 70 urges the pilot 60 and the slide member 50 inwardly of the guide member so as to urge toward each other the separate lens supporting frames and the lenses, clamps and nose pads associated therewith all for the purpose of fitting snugly upon the nose of the wearer.

As can be readily appreciated the frames may be separated against the action of the spring to a reasonable degree so as to permit entry of a person's nose of any width between the pads.

The invention may be embodied in other specific forms without departing from the essential characteristics thereof. Hence, the present embodiments are therefore to be considered in all respects merely as being illustrative and not being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secured by Letters Patent of the United States is:

The combination in eyeglasses having lens supporting means of a bridge construction comprising, a pair of separate lens supporting frames, a pair of arm members each having a lower portion fixed at one extremity to one of said frames with an opposite free extremity extending perpendicularly outwardly and away therefrom and having an intermediate portion fixed perpendicularly at one end to the free extremity of the lower portion with an opposite free end extending upwardly and away from the lower portion and having an upper portion fixed perpendicularly at one end to the free end of the intermediate portion with an opposite free extremity extending outwardly and forwardly away from the intermediate portion, an elongated guide member having one end secured to a free extremity of the upper portion of one of said arm members and having a free extremity extending towards the free extremity of the upper portion of the other of said arm members and provided with a longitudinal bore therethrough, an abutment intermediately secured in the bore of said guide member and provided with a pilot bore therethrough, a non-rotatable slide member having one end secured to and extending from the free extremity of the upper portion of the other of said arm members and being slidably receivable in the bore of said guide member, a pilot having one end secured to the opposite end of said slide member and slidably receivable through the pilot bore, a retainer on an opposite end of said pilot, and a compression spring around said pilot between said retainer and said abutment urging said pilot and said slide member inwardly of said guide member.

JOSEPH A. GAUDRAULT.

REFERENCES CITED

The following references are of record in the file of this patent:

UNITED STATES PATENTS

| Number | Name | Date |
|---|---|---|
| 588,175 | Prudden et al. | Aug. 17, 1897 |

FOREIGN PATENTS

| Number | Country | Date |
|---|---|---|
| 4,058 | Great Britain | Dec. 29, 1894 |